United States Patent [19]

Epstein

[11] 4,093,870
[45] June 6, 1978

[54] APPARATUS FOR TESTING REFLEXES AND/OR FOR FUNCTIONING AS A COMBINATION LOCK

[76] Inventor: Lawrence J. Epstein, 4216 Shoreclub Dr., Mercer Island, Wash. 98040

[21] Appl. No.: 680,217

[22] Filed: Apr. 26, 1976

[51] Int. Cl.$^2$ .............................................. B60R 25/04
[52] U.S. Cl. .................................. 307/10 R; 180/99; 340/53; 340/279; 70/278
[58] Field of Search ........................ 307/10 R, 10 AT; 180/99; 340/53, 63, 64, 279; 70/434

[56] References Cited

U.S. PATENT DOCUMENTS

| | | | |
|---|---|---|---|
| 3,610,943 | 10/1971 | Jones | 180/99 |
| 3,755,776 | 8/1973 | Kotras | 340/53 |
| 3,942,151 | 3/1976 | Takeuchi | 307/10 R |

*Primary Examiner*—L. T. Hix
*Assistant Examiner*—Stafford D. Schreyer
*Attorney, Agent, or Firm*—Thomas W. Secrest

[57] ABSTRACT

This invention is an electronic apparatus which is capable of creating a sequence of conditions for responding to signals. This apparatus, after certain lapsed times, creates a condition and which condition, is of a definite time duration. When the apparatus is in this condition, a signal can be introduced to the apparatus to change the state of the apparatus and also the output signal from the apparatus. Such an apparatus can be used as an electronic combination lock or can be used as a screening device to prevent an individual with a slow reflex from changing the state of the apparatus and the output signal of the apparatus. For example, the apparatus can be used in conjunction with the ignition of an automobile; and, if an intoxicated individual with a slow reflex tries to operate the apparatus, the intoxicated individual will not be able to change the state of the apparatus and the output signal of the apparatus. Thereby, the intoxicated individual is precluded from starting and driving the automotive vehicle. With this apparatus, it is necessary to change both the state of the apparatus and the output signal of the apparatus in order for the apparatus to function as an electronic combination lock or to function as a screening device.

10 Claims, 14 Drawing Figures

APPARATUS FOR TESTING REFLEXES AND/OR FOR FUNCTIONING AS A COMBINATION LOCK

THE GENERAL BACKGROUND OF THE INVENTION

As a project, I decided to construct an electronic lock, which, in my opinion, would be different from other electronic locks. For example, it is my understanding that there are other electronic locks using a keyboard and which keyboard may have an indefinite number of keys such as ten keys or five keys. These other electronic locks in the keyboard have a plurality of keys or a plurality of buttons. In order to operate these other electronic locks, it is necessary to activate the correct key or to push the correct button or to activate a plurality of correct keys or correct buttons.

With this knowledge, and other knowledge, of electronic locks, I decided to construct an electronic lock having one key or one switch which was based upon activating that one key or that one switch after the passage of a certain amount of time. In other words, my electronic lock is based on the passage of time and the activation of the single switch in the keyboard or the pushing of the single buttons in the keyboard at the correct time instead of pushing a correct button or a combination of buttons out of a plurality of buttons as taught with other electronic locks.

Further, in making this electronic lock, I used my preference for making the item out of electrical components instead of mechanical components as the electrical components can give a lifetime of service and can be placed on a relatively small board such as one chip and can occupy a relatively small volume. As contrasted with the electronic circuitry and the electronic components, a mechanical lock will wear out after a few years of service and also must have components large enough to be readily worked upon and assembled. Also, the keyboard must be, sufficiently, large so that an operator will activate, only, one button at a time.

After considering my electronic combination lock, I decided that I had invented more than a lock in that I had invented a screening device which could be used for testing the reflexes of individuals. The time period of my electronic lock or electronic apparatus could be adjusted to test the reflexes of individuals and also could be adjusted to screen out those individuals or prevent those individuals, whose reflexes are not sufficiently quick, from using another piece of equipment controlled by my electronic apparatus. For example, such equipment which can be controlled by my electronic apparatus is an automotive vehicle having my electronic apparatus in combination with the ignition of the automotive vehicle. If the individual has sufficiently good reflexes or coordination, the individual can activate my electronic apparatus to change the state of the apparatus and also to change the output signal of the apparatus. Then, the individual can start the automotive vehicle and drive away. If the individual's coordination or reflex action is not sufficiently good, the individual cannot change the state of my electronic apparatus and cannot produce an output signal. This precludes the activation of the ignition system of the automotive vehicle and also precludes the starting of the automotive vehicle and the driving away of the automotive vehicle.

THE GENERAL DESCRIPTION OF THE INVENTION

This apparatus, when in the quiescent state, does not have an active output. The registers, counters, and display have been cleared and there is no output.

When this apparatus is in the quiescent state, it is awaiting an input. The apparatus can remain in the quiescent state for an indefinite period of time.

An input can be introduced into the apparatus by means of activating the switch. Upon receiving this input or input signal, the display turns on and also the apparatus starts counting and starts the timing sequence to receive an input signal. The input signal can be a correct input signal or an incorrect input signal.

This apparatus can be so constructed that it can receive an indefinite number, N, of input signals. The apparatus can be so constructed that one input signal will be sufficient or can be so constructed that a large number of input signals are required. For example, in one version of this apparatus, four input signals are required. The apparatus, upon receiving the correct input signals, will give a certain response. This response will be the unlocking of the apparatus or the change of state of the apparatus so the apparatus is activated.

The apparatus is preprogrammed for a set series of signals. Assume that the apparatus requires four correct input signals in order to function. The apparatus is preprogrammed so that there is a definite time period or time periods between the signals for receiving the signals. In effect, two conditions must be met for the apparatus to function. These two conditions are the correct signals generated within the apparatus and also the signals received from the operator within the set time period. If these two conditions are met, then the state of the apparatus is changed and also the output signal from the apparatus is changed. The net result is that the apparatus is activated so as to unlock or open. If these two conditions are not met, the state of the apparatus is not changed and the output signal from the apparatus is not changed and the apparatus remains in the original state or in the locked state. In this manner, the apparatus can function as a screening apparatus to prevent an individual with the slow reflex from changing the state of the apparatus and the output of the apparatus. In this manner, the apparatus can be used in conjunction with the ignition of an automobile and if an intoxicated individual with a slow reflex tries to operate, the apparatus, the intoxicated individual will not be able to unlock or open the apparatus for activating the ignition of the automobile. Thereby, the intoxicated individual is precluded from starting and driving the automotive vehicle.

THE OBJECTS AND THE ADVANTAGES

A primary object of this invention is to provide a reliable electronic lock or a reliable electronic screening device; another object is to provide a screening apparatus or a lock comprising electrical components and having few mechanical parts; a further important object is to provide an electronic lock which is pick proof or which cannot be opened by chance but can only be opened or activated by a person knowing the combination; an additional object is to provide such an apparatus which requires only a minimum or maintenance and repair; a further and important object is to provide such an apparatus having a time base so that a person trying to operate said apparatus has to have a good set of reflexes and a good sense of timing or otherwise the person cannot operate the apparatus; another object is to provide such an apparatus wherein it is possible to, readily, adjust the time base; an additional object is to provide such an apparatus which can be converted into an electrical chip upon sufficient demand for the apparatus and thereby lessen the cost of manufacture; an additional object is to provide such an apparatus requiring a minimum of space or area on a panel; another object is to provide such an apparatus which is, in mass production, low in cost and inexpensive; a further and important object is to provide such an apparatus which can be used as a screening devide to determine if an individual is competent to operate certain pieces of machinery, and, another and important object of this invention is to provide such an apparatus so as to prevent individuals from operating certain machines or from going into certain areas.

These and other important objects and advantages will be more particularly brought forth upon reference to the specific description of the invention, the appended claims, and the accompanying drawings.

THE DRAWINGS

FIG. 2-A is a schematic outline of circuitry comprising combination switches, gates, storage elements, and an output gate;

FIG. 2-B is a schematic outline of one species for the circuitry for counters, clock, decoder, pulse and delay circuitry, clear and reset gates, one shot, input device, and display;

THE SPECIFIC DESCRIPTION OF THE INVENTION

Figure 1:
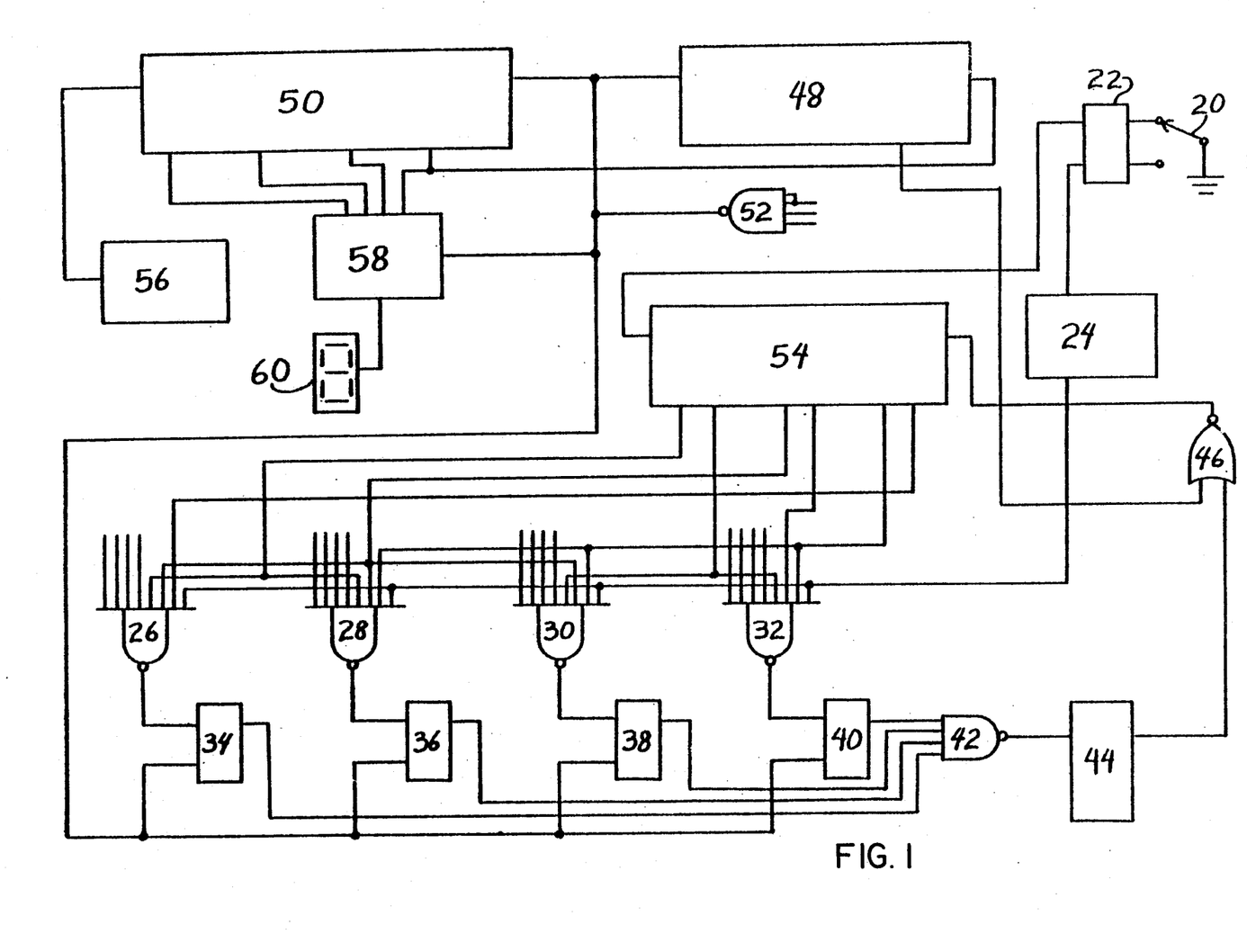
FIG. 1 is a schematic outline of the circuitry employed in this apparatus.

In FIG. 1 there is a schematic illustration of the components of this invention and the wiring diagram for connecting the components into the subject apparatus.

With reference to FIG. 1, it is seen that there is an input button or an input switch 20. There is associated with the button 20 an input flip-flop 22.

The input flip-flop 22 connects with a pulse-and-delay unit 24. The pulse-and-delay unit connects with four input gates 26, 28, 30, and 32. There is associated with the input gate 26 a storage unit 34; associated with the input gate 28, a storage unit 36; associated with the input gate 30, a storage unit 38; and, associated with the input gate 32, a storage unit 40.

The storage units 34, 36, 38, and 40 are associated with an output gate 42.

The output gate 42 is associated with a monostable multivibrator 44. The monostable multivibrator 44 is associated with a reset gate 46.

The reset gate 46 is associated with a reset counter 48 which is associated with a decade counter 50 and with a clear gate 52.

Figure 2A:
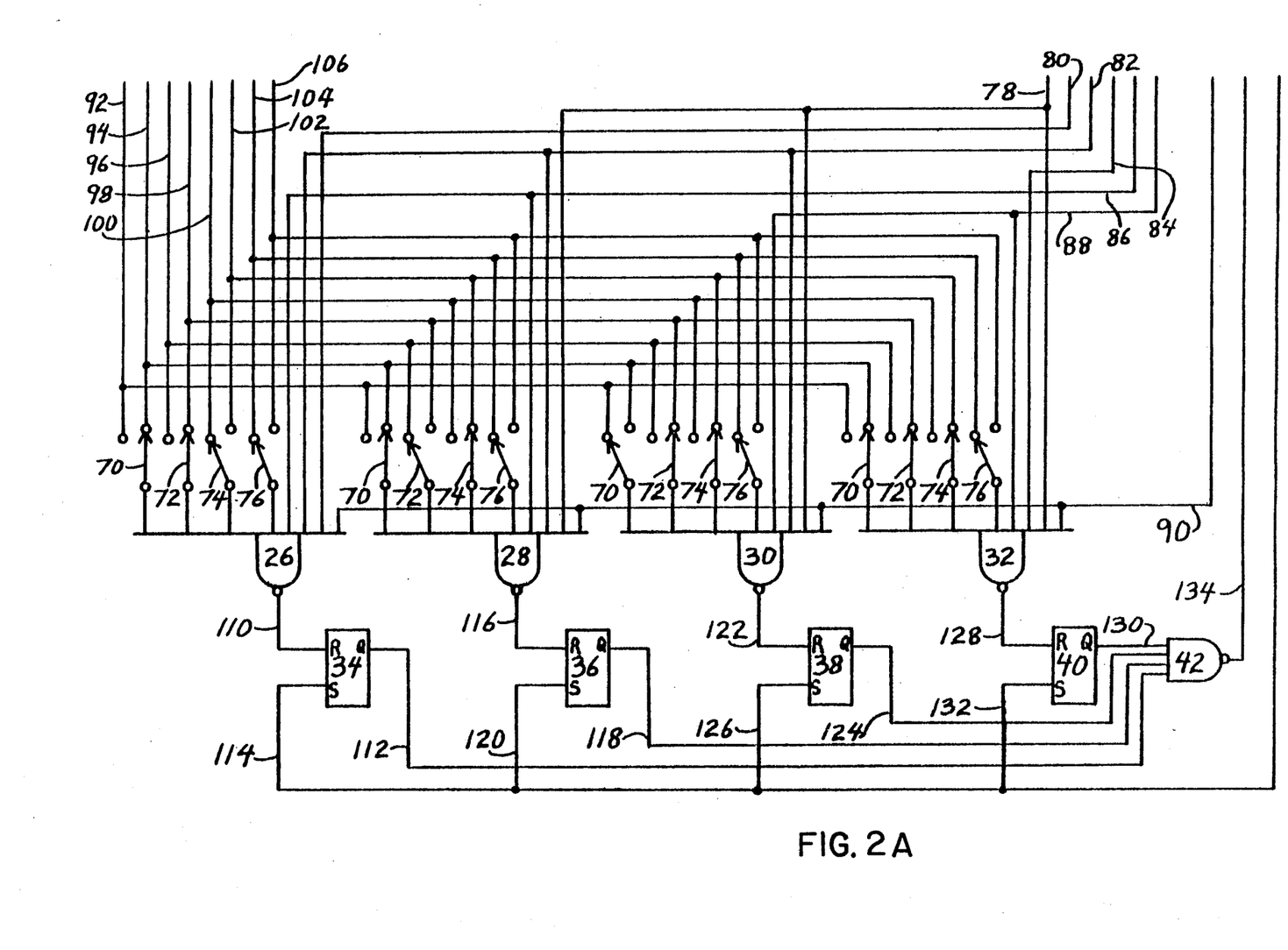
Figure 2B:
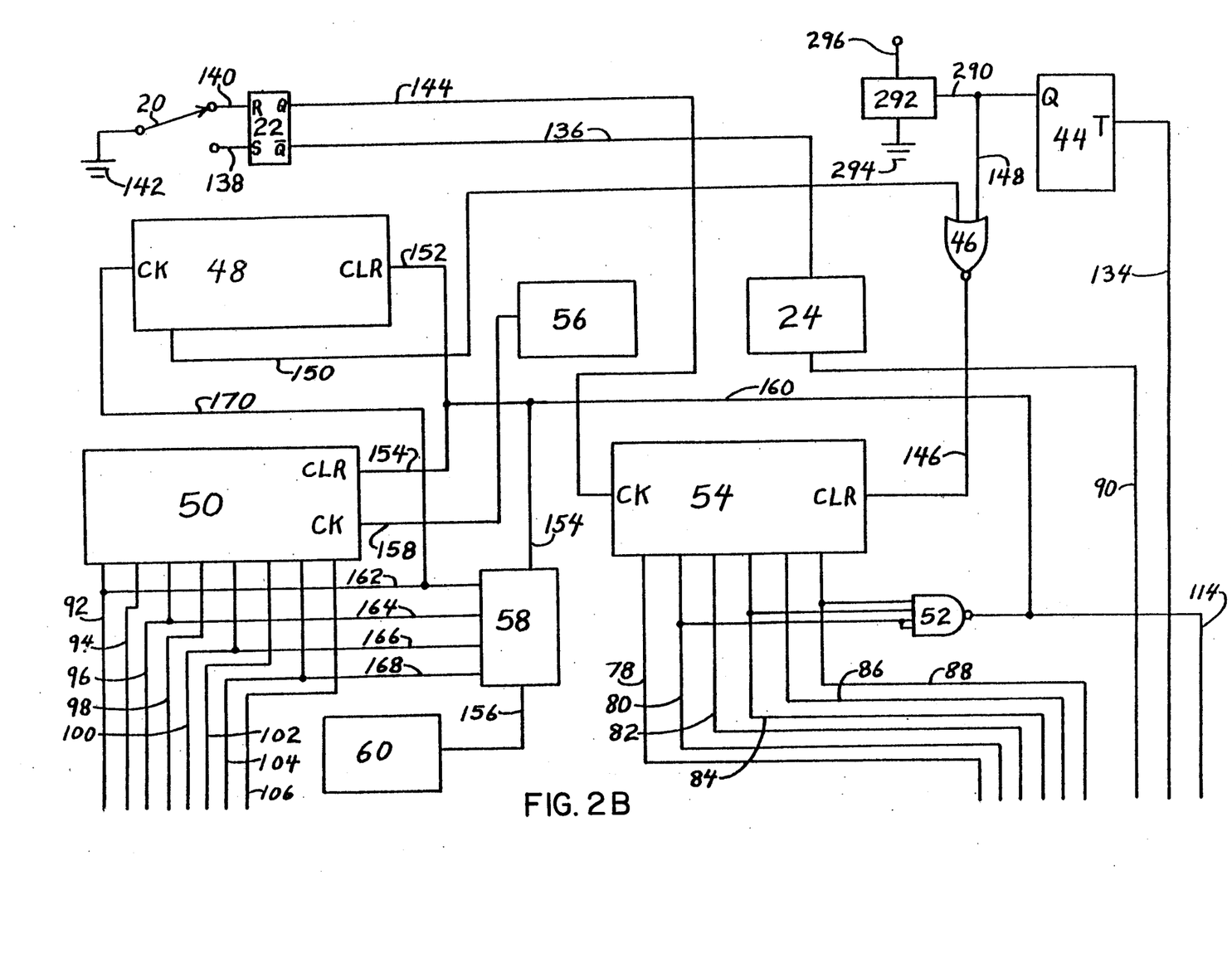

In FIG. 2-A and FIG. 2-B there is a more detailed illustration of the circuitry for this invention.

In order to avoid being redundant, the connections of the input gates 26, 28, 30 and 32 in connecting with the Jonson counter 54 will be assigned the same reference numerals for corresponding connections and connecting with the decade counter 50 will be assigned the same reference numerals for corresponding connections.

In FIG. 2-A it is seen that the input gates 26, 28, 30, and 32 have eight input connections. Each of these gates has four switches, 70, 72, 74 and 76 for connecting with the decade counter.

The Johnson counter has six input lines for the four gates 26, 28, 30, and 32. However, only three of the input lines connect with any one gate. The six input lines from the Johnson counter are 78, 80, 82, 84, 86, and 88. The input line 78 connects with the gates 28, 30, and 32. The input line 80 connects with the gate 26. The input line 82 connects with the gates 26, 28, and 30. The input line 84 connects with the gate 32. The input line 86 connects with the gates 26 and 28. The input line 88 connects with the gates 30 and 32. The four gates 26, 28, 30, and 32 connect with the pulse and delay line 90.

There are eight input lines from the decade counter which can connect, in sets of four, with the four switches of the input gates. More particularly, there is the line 92 which is the D-output of the decade counter; the line 94 which is the not-D output; the line 96 which is the C-output of the decade counter; the line 98 which is the not-C line; the line 100 which is the B-output of the decade counter; the line 102 which is the not-B line; the line 104 which is the A-output of the decade counter; and, the line 106 which is the not-A line.

The six output lines of the Johnson counter are identified as line 78 which is the C-output of the Johnson counter; line 80 which is the not-C line; line 82 which is the B-output of the Johnson counter; line 84 which is the not-B line; line 86 which is the A-output line of the Johnson counter; and line 88 which is the not-A line.

The gate 26, with switch 70, connects with line 94, the not-D line; with switch 72 connects with the line 98 which is the not-C line; with switch 74 connects with 100 which is the B line; and, with switch 76 connects with line 104 which is the A line.

In FIG. 2, it is seen that the gate 28 with switch 70 connects with line 94; with switch 72 connects with line 96; with switch 74 connects with line 102; and with switch 76 connects with line 104.

In FIG. 2-A, it is seen that the gate 30 with switch 70 connects with line 92; with switch 72 connects with line 98; with switch 74 connects with line 102; and with switch 76 connects with line 104.

In FIG. 2-A, it is seen that the gate 32 with switch 70 connects with line 94; with switch 72 connects with line 98; with switch 74 connects with line 102; and, with switch 76 connects with line 104.

To recapitulate, the gates 26, 28, 30, and 32 present 16 switches in four sets of 4 switches each so that in each set 4 switches connect with 4 lines, at any one time, from the decade counter. Further, it is to be realized that for different timing sequences, the switches can be moved to connect with different output lines of the decade counter.

There are four set-reset flip-flop units 34, 36, 38, and 40.

The input gate 26 connects with 34 by means of line 110, 34 by means of line 112, connects with output gate 42. Also, 34 connects with line 114.

Input gate 28 connects with 36 by means of line 116. 36, by means of line 118, connects with output gate 42 and by means of line 120 connects with line 114.

Input gate 30 connects with 38 by means of line 122. 38, by means of line 124 connects with output gate 42 and by means of line 126 connects with line 114.

Input gate 32, by means of line 128, connects with 40. 40 by means of line 130, connects with output gate 42 and by means of line 132 connects with line 114.

The output gate 42 connects with the monostable multivibrator 44 by means of line 134.

The line 90 connects with a pulse-and-delay unit 24. The pulse and delay unit, by means of line 136 connects with the set-reset input flip-flop 22. The flip-flop 22 has two external lines 138 and 140. A switch 20 can connect with the line 138 or 140 and also connects with ground 142.

The flip-flop 22, by means of a line 144, connects with the Johnson counter 54. The Johnson counter 54, as, previously, explained, connects by means of lines 78, 80, 82, 84, 86, and 88 with the various input gates 26, 28, 30, and 32.

The line 80, a not-C line; the line 84, a not-B line; and the line 88, a not-A line connect with the clear gate 52 which in turn connects with the line 114 connecting with the flip-flops 34, 36, 38, and 40.

The Johnson counter 54, by means of a line 146, connects with a reset gate 46. The reset gate 46, by means of a line 148, connects with the monostable multivibrator 44. Also, the reset gate 46, by means of a line 150 connects with the reset counter 48.

The reset counter 48, by means of a line 152, connects with line 154. The line 154 connects a decade counter 50 and decoder 58.

The decoder 58, by means of line 156, connects with display 60.

the decade counter 50, by means of line 158, connects with the clock 56.

A line 160 connects a line 114 and the line 152.

The decade counter connects with lines 92, 94, 96, 98, 100, 102, 104, and 106.

A line 162 connects the decoder 58 with the line 92; a line 164 connects the decoder 58 with the line 96; a line 166 connects the decoder 58 with the line 100; and, a line 168 connects the decoder 58 with the line 104.

A line 170 interconnects the reset counter 48 and the line 162.

Figure 3:
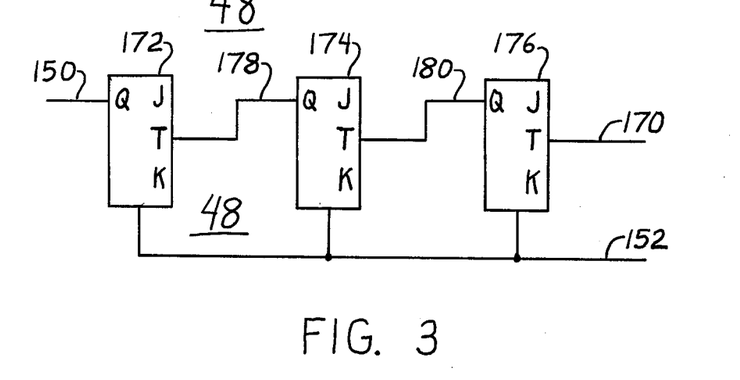
FIG. 3 is the circuitry for a reset counter which in this case is a basic binary counter.

In FIG. 3, there is a schematic illustration of the reset counter 48 and which illustration shows the lines 150, 152, and 170, and each individual bistable flip-flop. There are three bistable multivibrators or flip-flops 172, 174 and 176. The line 150 connects with the flip-flop 172. A line 178 connects the two flip-flops 172 and 174. A line 180 connects the two flip-flops 174 and 176. The line 170 connects with the flip-flop 176. All of the flip-flops connect with the line 152. For clarification, the input is line 170 to the flip-flop 176 and the output is line 150 from the flip-flop 172. The line 152 is a clear line for clearing the reset counter 48, the display 60, the decade counter 50, and the storage units 34, 36, 38, and 40.

Figure 4:
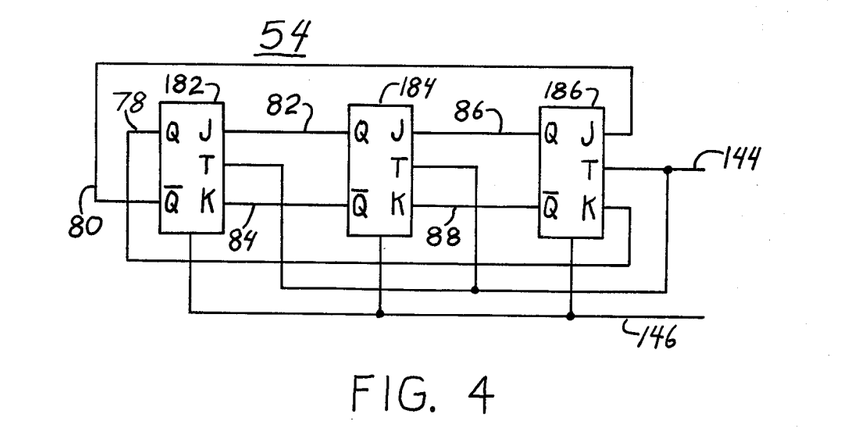
FIG. 4, is a Johnson counter.

In FIG. 4, there is a schematic outline of the Johnson counter 54.

In the Johnson counter 54 are 3 J-K flip-flops 182, 184, and 186. The input line 144 connects with all three of these flip-flops. The clear line 146 connects with all three of these flip-flops. A line 80 and the line 78 connect the flip-flop 182 with the flip-flop 186. The line 82 connects the flip-flop 182 and the flip-flop 184 and the line 86 connects the flip-flop 184 and the flip-flop 186. The line 84 connects the flip-flop 182 and the flip-flop 184 and the line 88 connects the flip-flop 184 and the flip-flop 186.

Figure 5:
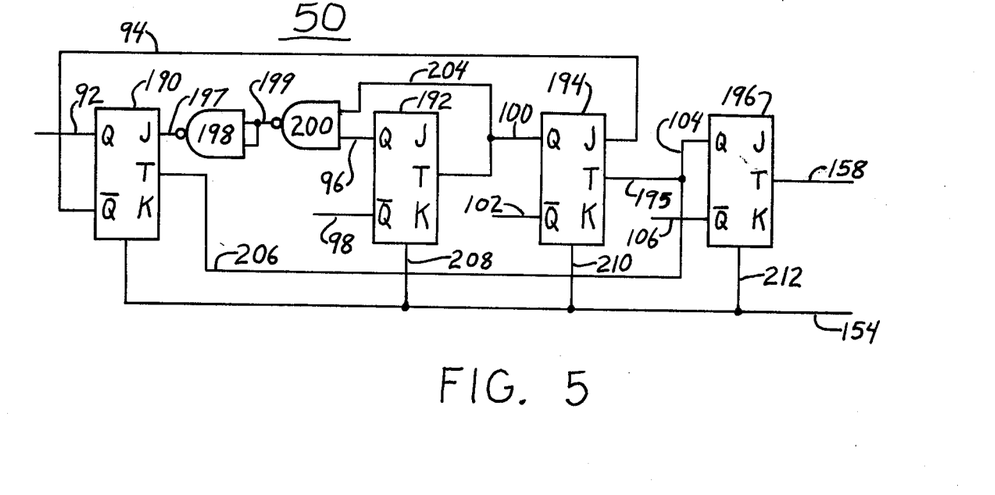
FIG. 5 is a decade counter.

In FIG. 5, there is illustrated the schematic diagram for the decade counter 50. It is seen that the counter comprises four J-K flip-flops, 190, 192, 194, and 196. The flip-flop 190, by means of line 94, connects with flip-flop 194. Also, the line 92 connects with the flip-flop 190. The flip-flop 190 connects eith the line 154.

The flip-flop 190, by means of line 197, connects with gate 198. Gate 198, by means of line 199, connects with gate 200. The gate 200 connects with the flip-flop 192 by means of line 96 and also connects with flip-flop 192 by means of line 204. Further, the gate 200 connects by means of line 204 and line 100 with flip-flop 194.

The flip-flop 190, by means of line 206 and line 104 connects with flip-flop 196 and by means of line 206 and 195 connects with flip-flop 194.

The flip-flop 192, by means of line 208, connects with line 154; flip-flop 194, by means of line 210, connects with line 154; and, flip-flop 196, by means of line 212, connects with line 154.

The flip-flop 194 by means of line 195, connects with line 104 and flip-flop 196.

Figure 6:
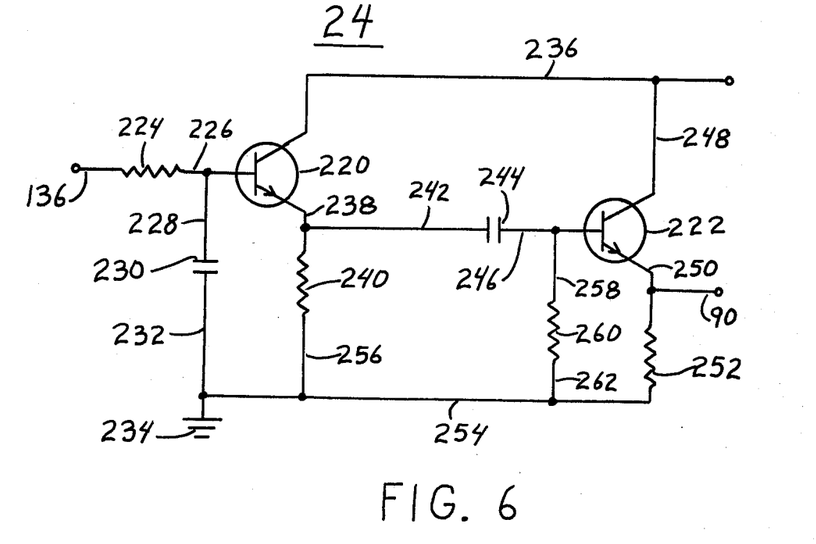
FIG. 6 is a schematic of the pulse and delay circuitry.

In FIG. 6, there is illustrated the pulse-and-delay unit 24 comprising the two NPN transistors 220 and 222.

A line 136 connects with the resistor 224 which, by line 226, connects with the base of the transistor 220. Also, the line 226 connects with the line 228 which connects with a condenser 230. The condenser 230 connects with a line 232 which is grounded at 234.

There is a line 236 which connects with the 5-volt supply and also connects with the collector of the transistor 220. The emitter of the transistor 220 connects with the line 238 which connects with the resistor 240. A line 242 connects with the line 238 and also with a capacitor 244. The capacitor 244 connects with the line 246 which connects with the base of the transistor 222. A line 248 connects with the line 236 and also with the collector of the transistor 222.

The emitter of the transistor 222 connects with a line 250 which in turn connects with the resistor 252. The line 90 connects with the line 250.

The resistor 252 connects with the line 254 which in turn connects with the line 232.

A line 256 connects the resistor 240 and the line 254.

A line 258 connects with the line 246 and with the resistor 260. A line 262 connects the resistor 260 and the line 254.

Figure 7:
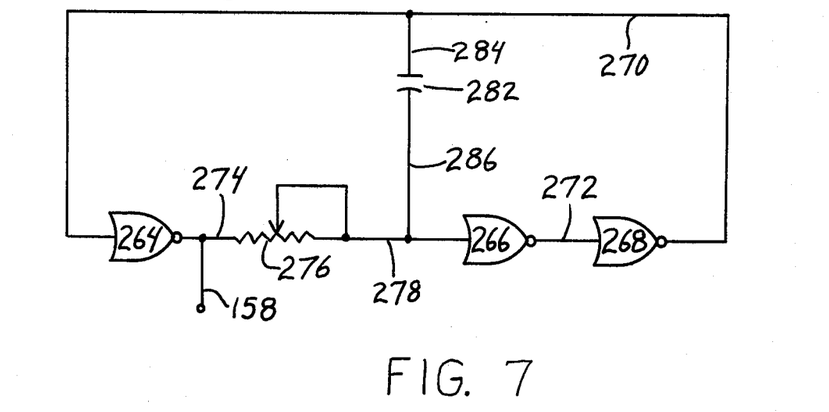
FIG. 7 is a schematic of the clock circuitry.

In FIG. 7, there is illustrated a clock 56 having the three NOR gates 264, 266, and 268. The gate 268 connects with the gate 264 by means of line 270. The gate 266 connects with gate 268 by means of line 272.

The gate 264, by means of line 274, connects with potentiometer 276. The potentiometer 276 connects with line 278. The line 278 connects with the gate 266.

There is a capacitor 282 which connects with line 270 by means of line 284 and connects with line 278 by means of line 286.

In FIG. 2-B, it is seen that a line 290 connects with a unit 292 which in turn connects with the ground 294 and also connects with plus voltage 296. In FIGS. 8, 9, 10 and 11, there is illustrated different circuits which may be used in place of 292.

Figure 8:
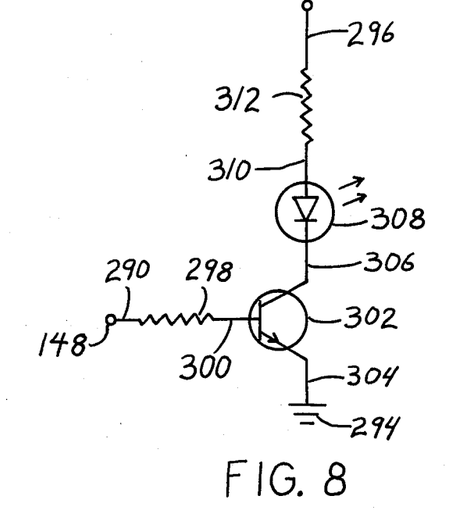
FIG. 8 is a schematic of the light indicator circuitry.

In FIG. 8, the line 290 connects with line 148 and with resistor 298. The resistor 298, by means of line 300, connects with NPN transistor 302. The emitter of the transistor 302, by means of line 304, connects with the ground 294.

The collector of the transistor 302, by means of line 306, connects with a light emitting diode 308.

The light emitting diode, by means of line 310, connects with resistor 312 which, in turn, connects with the positive source 296.

Figure 9:
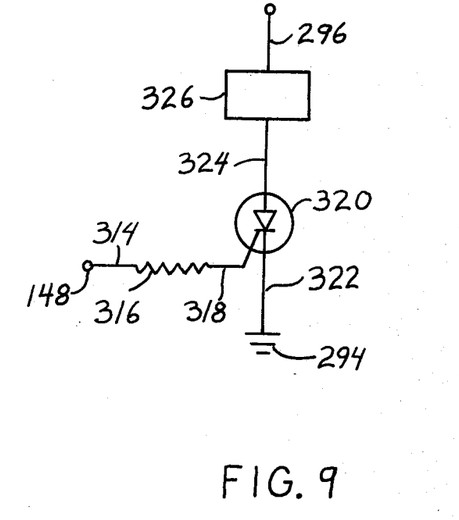
FIG. 9, in schematic form, is the solid state direct current load driver circuitry.

In FIG. 9, there is illustrated another circuit which can be used for block 292.

In FIG. 9, a line 314 connects with the line 148 and also connects with a resistor 316. The resistor 316 connects with a line 318 which, in turn, connects with a silicon control rectifier 320. The silicon control rectifier, by means of line 322, connects with the ground 294.

The silicon control rectifier, by means of line 324, connects with the load 326 which, in turn, connects with the positive voltage 296.

The load 326 may be a DC motor, a solenoid, a lamp, a bell, or the like. The load 326 is a DC load or a direct current load.

Figures 10, 11:
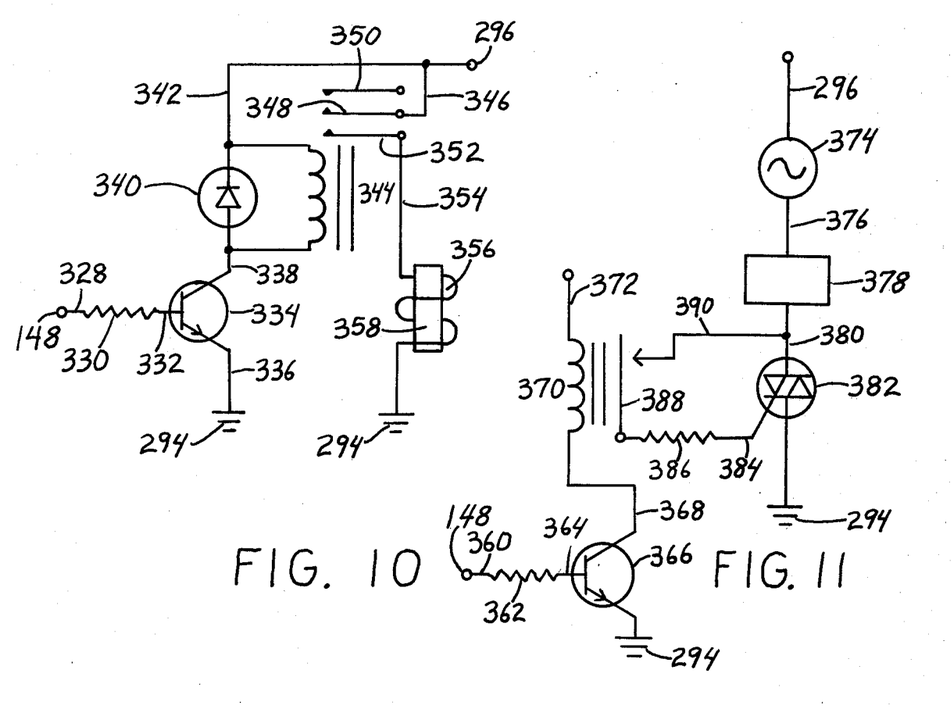
FIG. 10, in schematic form, is the solenoid driver circuitry.
FIG. 11, in schematic form, is the solid state alternating current load driver circuitry.

In FIG. 10, there is illustrated another circuit which may be used in 292 and which circuit is for a lock or a lock bolt. A transistor controls a relay and thereby controls the operation of a solenoid which controls the lock or the lock bolt.

A line 328 connects with the line 148 and connects with the resistor 330. The resistor 330, by means of a line 332, connects with the base of the NPN transistor 334. The emitter of the transistor 334, by means of line 336, connects with the ground 294.

The collector of the transistor 334 connects with a line 338 which, in turn, connects with the diode 340. The diode 340 connects with the line 342 which, in turn, connects with the positive source 296.

There is a relay 344 which connects with the line 338 and also the line 342.

There is a line 346 which connects with the line 342 and connects with a movable relay switchblade 348 or a movable contact 348. There is a dead contact 350 and also a live contact 352.

The live contact 352, by means of line 354, connects with the solenoid coil 356 and the coil 356 connects with the ground 294.

The coil 356 controls the plunger or movable member 358. The circuit of FIG. 10 can be used for locking a unit by means of the movable plunger 358 or for unlocking a unit by means of the movable plunger 358.

In FIG. 10, is is seen that the movable contact 348 is controlled by the relay 344. The activation of relay 344 may move the contact 348 into electrical contact with contract 352 to move the plunger 358, Or, the relay 344 may move the movable contact 348 away from electrical contact to the contact 350 to also change the position of the plunger 358. In this manner it is possible to control the position of a bolt for a lock so as to open a lock or to close a lock.

In FIG. 11, there is illustrated an AC driver circuit for use in block 292. This AC driver circuit has the advantage of the DC control of FIGS. 2-A and 2-B and also the advantage of a, relatively, high power circuit for the AC load.

In FIG. 11, it is seen that a line 360 connects with a line 148 and also connects with a resistor 362. Resistor 362 by means of a line 364, connects with the base of an NPN transistor 366. The emitter of the transistor 366 connects with the ground 294.

The collector of the transistor 366 connects with the line 368 which connects with the relay 370. The relay 370 also connects with a line 372 which connects with positive voltage.

There is an AC source 374. The source 374, by means of line 376, connects with the load 378. The load 378, by means of line 380, connects with the triac 382. The triac 382 is a solid state alternating current semiconductor and connects with a ground 294. Further, the triac 382, by means of line 384, connects with a resistor 386 which connects with a movable contact 388 of the relay 370. A line 390 connects with the line 380 and may connect with the movable contact 388.

With activation of the relay 370, the movable contact 388 moves toward the line 390 so as to move the contact 388 into electrical contact with the line 390 to activate the circuit. With the activation of the circuit, the load can be activated. The load 378 can be a normal AC load, such as an AC motor, a solenoid, a lamp, a bell, and the like.

With the deactivation of the relay 370, the movable contact 388 moves away from the line 390 so as to deactivate the load 378. This is determined by the relay being in a normally open or normally closed position.

The method of operation of this invention with respect to a load will be described. The load may be a solenoid for the bolt of a lock. Or, the load may be the ignition in a vehicle, such as an automotive vehicle, or a boat, or an airplane. In effect, the load may be an ON-OFF signal for controlling circuitry for control purposes. In the configuration of FIGS. 1 through 11, there are four conditions to be satisfied. With the satisfaction of these four conditions, the circuitry functions for a short time period to send a signal for control purposes. If the load is a lock comprising a bolt and a control solenoid for the bolt, the circuitry will be able to send a signal for a short time period to the solenoid to move the position of the bolt so as to unlock the lock or else to lock the lock. The duration of the signal may be for two or three seconds. The duration of the signal is controlled by the monostable multivibrator 44. By setting the multivibrator for a set period of time, there can be produced a signal for a corresponding set period of time. For example, the multivibrator can be set so that there may be a signal for 10 seconds or a longer period of time, dependent upon the use to which the signal is to be placed.

In operation and assuming an initial operation, all of the counters and storage flip-flops are at zero and the circuitry is in a quiescent state. Then, the button 20 or the switch 20 can be moved to activate the circuit. The Johnson counter, upon activation of the circuit with the movement of the switch 20, is activated. With the activation of the Johnson counter, the display 60, the decoder 58, the decade counter 50, and the reset counter 48 are activated or enabled. Also, with the activation of the Johnson counter 54, the clear gate 52 is enabled and the flip-flops 34, 36, 38 and 40 are enabled.

There is a predetermined code with which the gates 26, 28, 30 and 32 can be satisfied and activated. The input conditions for gates 26, 28, 30 and 32 have been preset or predetermined. For example, see FIG. 2-A, the gate 26 is set for the numeral 3; the gate 28 is set for the numeral 5; the gate 30 is set for the numeral 9; and the gate 32 is set for the numeral 1. With the satisfaction of these 4 predetermined settings or conditions, the signal will be sent to the load to control the load.

Decade counter is counting, and there are four input lines on the gate 26 from the decade counter 50. On the display 60, the number 3 appears which places 4 highs on the input gate 26. The operator, upon seeing numeral 3 on the display 60, pushes the switch 20. With the pushing of the button 20, the Johnson counter advances to the next state and places 3 highs on the gate 26, for example, not-C, B and A in FIG. 2-A. Also, with the activation of the switch 20 or the button 20, the pulse-and-delay unit 24 sends a signal to gate 26 and which signal arrives at gate 26 shortly after the four signals from the decade counter and the three signals from the Johnson counter arrive. With eight high signals on the gate 26, the output of the gate 26 goes low, which changes the state of the flip-flop 34. The output of the flip-flop 34 goes to the input of the output gate 42. Gate 28 is set for the numeral 5.

With the appearance of the numeral 5 on the display 60, the operator pushes the button 20 or the switch 20 so as to advance the Johnson counter to its next state. The decade counter provides 4 highs to gate 28 and the Johnson counter provides 3 highs to gate 28, A, B, and C. Again, the pulse-and-delay unit 24 sends a signal to gate 28 and with 8 highs on the gate 28, the output of gate 28 is a low which activates the flip-flop 36. The flip-flop 36 sends an input signal to the output gate 42.

Similarly, the operator waits for the display unit 60 to show the numeral 9. The numeral 9 is the code number for the gate 30. With the numeral 9 on the display 60, the operator will throw the switch 20 or the button 20 so as to advance the Johnson counter to its next state. With the display 60 showing the numeral 9, there are 4 highs from the decade counter 50, on the gate 30. The Johnson counter sends 3 highs to the gate 30, not-A, B, and C. Again, the pulse-and-delay unit 24 sends a high to input gate 30. There are now 4 highs on input gate 30 and the output of gate 30 is a low signal to the flip-flop 38. The output of the flip-flop 38 goes to the output gate 42.

The operator, again, waits for the display 60 to show the numeral 1. The numeral 1 is the code number for the input gate 32. With the numeral 1 appearing on the display 60, the operator pushes the button 20 or the switch 20 so as to advance the Johnson counter. There are 4 highs on the input gate 32 from the decade counter 50. The Johnson counter supplies 3 highs to the gate 32, a not-A, a not-B and a C. The pulse-and-delay unit 24 sends a high to the gate 32 and the output of the gate 32 is a low which activates the flip-flop 40. The flip-flop 40 sends a signal to the output gate 42.

The control for the number for the gates 26, 28, 30, and 32 is achieved by means of the switches 70, 72, 74, and 76, see FIG. 2-A. By resetting the switches, it is possible to control the highs to the gates and control the number for controlling the gates. In FIG. 2-A, it is seen that the combination for the gates 26, 28, 30, and 32 can be changed ro reset. As an alternative, the wiring for the gates 26, 28, 30 and 32 can be such that it is set at the factory and there are no switches 70, 72, 74 and 76. The combination, once set at the source of manufacture, is determined for the life of the circuitry or the user can make a new combination. With the switches 70, 72, 74, and 76, the combination for the circuitry can be changed when necessary.

For illustrative purposes, this invention has been described with a four-digit combination. It is to be realized that the combination may comprise any reasonable number of digits. For example, the combination may have one digit exemplified by input gate 26 and flip-flop 34. Or, the combination may have an indefinite number, such as n, of combinations. For example, for a complicated lock or control, there may be ten combinations. It is therefor necessary for the operator to know a ten-number combination, in proper sequence, in order to activate the load or deactivate the load 292.

In the lock illustrated in FIGS. 1, 2-A and 2-B, there are four cycles and in these four cycles, the button 20 or the switch 20 must be activated for the proper number. For example, initially, the input gate 26 is preprogrammed for the numeral 3; the input gate 28 is programmed for the numeral 5; the input gate 30 is preprogrammed for the numeral 9; and the input gate 32 is preprogrammed for the numeral 1. There are four cycles in which this combination of 3-5-9-1 can be worked. For example, on the first cycle, the display 60 may show the numerals 0, 1, 2, and 3. On the numeral 3 the button 20 is activated. Then, on the second cycle, the display 60 may show the numerals 0, 1, 2, 3, 4 and 5. On the numeral 5, the button 20 is activated. On the third cycle, the display 60 may show the numerals 1, 2, 3, 4, 5, 6, 7, 8 and 9. On the numeral 9, the button is activated. On the fourth cycle, the display 60 may show the numerals 0 and 1. On the numeral 1, the button 20 is activated and the load 292 is activated or deactivated, as the circuit commands. Further, it is possible to work the combination 3-5-9-1 in two cycles. For example, in the first cycle, the display 60 may show the numerals 0, 1, 2, and 3. On the numeral 3, the button 20 is activated. Then, the display 60 may show the numerals 4 and 5. On the numeral 5, the button 20 is activated. Then, the display 60 may show the numerals 6, 7, 8 and 9. On the numeral 9, the button 20 is activated. Then, on the second cycle, the display 60 may show the numerals 0 and 1. On the numeral 1, the button 20 is activated, and the load 292 is activated or the load 292 is deactivated, as the circuit commands. Further, the cpmbination may be worked in three cycles so as to deactivate the load 292 or activate the load 292 as the circuit commands.

Now, with a number such as 8-6-4-2 for the combination, the input gate 26 is set for the numeral 8; the input gate 28 is set for the numeral 6; the input gate 30 is set for the numeral 4; and, the input gate 32 is set for the numeral 2. With a number such as 8-6-4-2, it is necessary to have four cycles to activate the load 292 or deactivate the load 292 as the circuit commands. For example, on the first cycle, when the numeral 8 appears on the display 60, the button 20 is activated. Then, on the second cycle, when the numeral 6 appears on the display 60, the button 20 is activated. Then, on the third cycle, when the numeral 4 appears on the display 60, the button 20 is activated. Finally, on the fourth cycle, when the numeral 2 appears on the display 60, the button 20 is activated.

Now, with a number such as 8-6-4-2 for the combination, the input gate 26 is set for the numeral 8; the input gate 28 is set for the numeral 6; the input gate 30 is set for the numeral 4; and, the input gate 32 is set for the numeral 2. With a number such as 8-6-4-2, it is necessary to have four cycles to activate the load 292 or deactivate the load 292 as the circuit commands. For example, on the first cycle, when the numeral 8 appears on the display 60, the button 20 is activated. Then, on the second cycle, when the numeral 6 appears on the display 60, the button 20 is activated. Then, on the third cycle when the numeral 4 appears on the display 60, the button 20 is activated. Finally, on the fourth cycle, when the numeral 2 appears on the display 60, the button 20 is activated.

More generally, with the descending order of numerals, four cycles are required. With an ascending order of numerals, less than four cycles will suffice to activate the load 292 or deactivate the load 292 as the circuit commands. To recapitulate, the line 92 from the decade counter 50 is the D-output. When the D-output goes from high to low, the reset counter 48 is clocked to its next highest state. Then, when the decade counter 50 goes from 9 to 0, the D-output 92 goes from high to low, the reset counter is triggered or clocked a second time, or for a second cycle. On the third cycle, similarly, when the decade counter 50 goes from 9 to 0, the D-output 92 triggers the reset counter 48 so as to clock the reset counter a third time. And, on the fourth cycle, when the decade counter 50 goes from 9 to 0, the D-output 92 triggers the reset counter 48 for the fourth time or for the fourth cycle. When the reset counter 48 is triggered for the fourth cycle, the output 150 goes high which goes to the reset gate 46. As a result, the reset gate 46 goes low. With the reset gate 46 going low, the Johnson counter 54 is cleared. With the Johnson counter being cleared, the gate 52 goes low and the entire circuitry is cleared or reset for another series of cycles. In FIG. 2-B, the D-output 92 connects with the decade counter 50 and with the reset counter 48 and functions as a clock for the reset counter 48.

Figure 12:
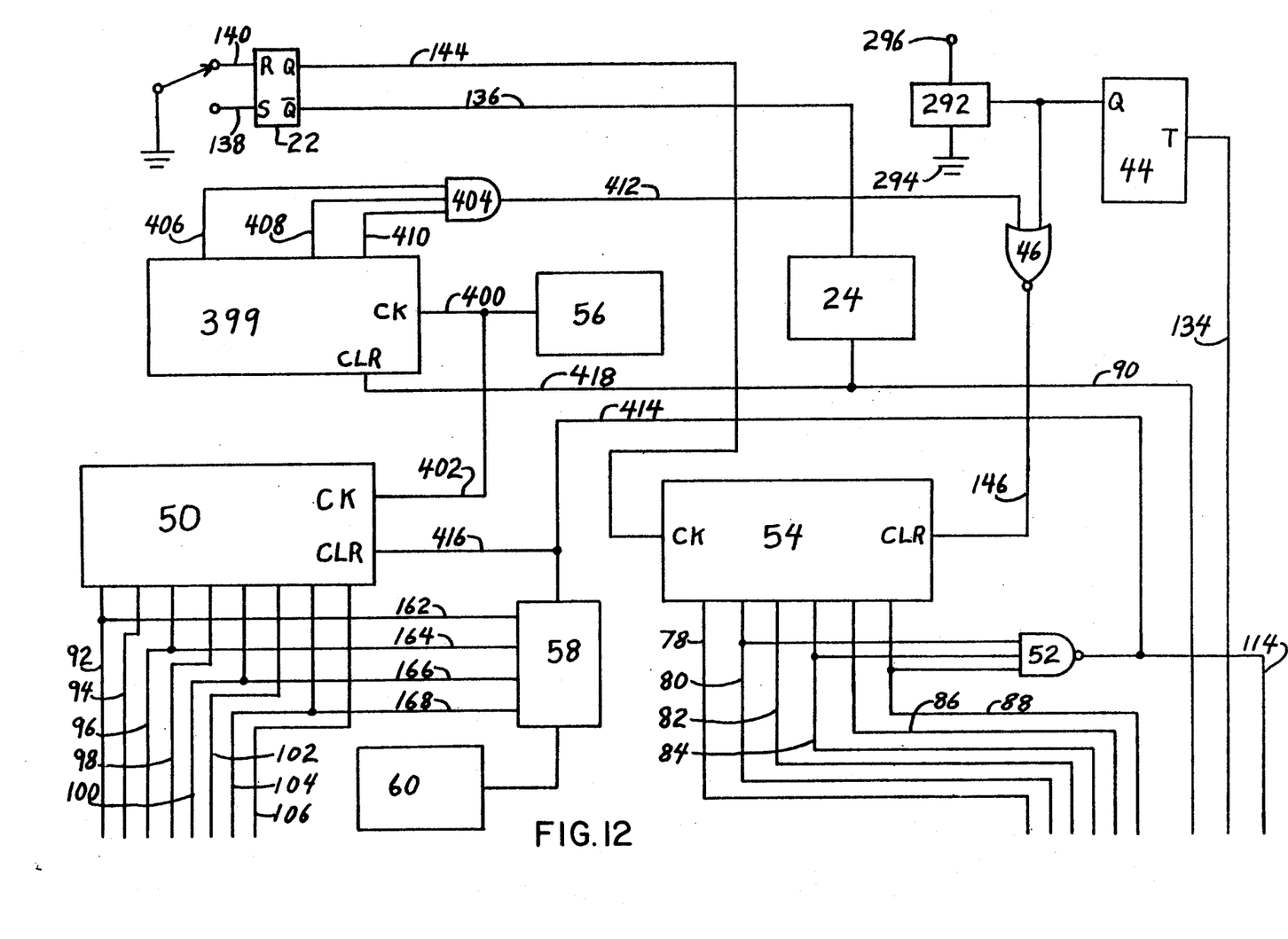
FIG. 12 is a schematic outline of another species of circuitry for counters, clock, decoder, pulse and delay circuitry, clear and reset gates, one shot, input device, and display; and, FIG. 13 is a four bit reset counter.

FIG. 12 is similar to FIG. 2-B. The circuitry of FIG. 12 can be used with the circuitry of FIG. 2-A and in place of the circuitry of FIG. 2-B. In FIG. 12, the clock 56 connects with the reset counter 399 by means of line 400 and the decade counter 50 connects with the line 400, i.e., with the clock 56, by the line 402. Also, the D-output 92 of the decade counter 50 does not connect with the reset counter 399. The clock for the reset counter 399 is the clock 56 and it is not necessary to have the D-output 92 of the decade counter 50 function as a clock for the reset counter 399. Also, in FIG. 12, the reset counter 399 is cleared by the pulse-and-delay unit 24 whereas, in FIG. 2-B, the reset counter 48 is cleared by the output of gate 52. Further, in FIG. 12, it is seen that there is a summing gate or the "AND" gate 404. The gate 404 connects with the reset counter by lines 406, 408, and 410. Further, the summing gate 404 connects with the reset gate 46 by means of line 412. In FIG. 2-B, the reset gate 46 connects directly with the reset counter 48 by means of line 150. In FIG. 12, between the reset gate 46 and the reset counter 399, there is the summing gate 404. Also, in FIG. 12, it is seen that the clear gate 52, by means of a line 414 connects directly with the decoder 58 and that a line 416 connects the line 414 with the decade counter 50. In FIG. 2-B, the clear gate 52 connects with both the reset counter 48, the decade counter 50 and the decoder 58. In FIG. 12, the clear gate 52 connects only with the decade counter 50 and the decoder 58 and does not connect with the reset counter 48.

Another species of this lock is illustrated in FIGS. 12 and 2-A. The components or circuity of FIG. 12 can be used in conjunction with the circuitry and components of FIG. 2-A and in place of the circuitry and components of FIG. 2-B. In this combination of FIGS. 12 and 2-A, there may be only one display of the numerals on the display 60. For example, if all of the four numbers are in ascending order, there may be only one display for the four numbers. For example, if the numbers are 3, 5, 7, and 9, the button 20 must be activated four times in going from the number 0 through the number 9. The first number to appear on he display will be the number 0. Then, the numbers 1, 2, and 3 will appear in sequential order and with the appearance of the number 3, the button 20 must be moved or switched. A new cycle starts with the appearance of number 4 on the display 60. After number 4 has appeared on the display 60 and number 5 appears, then, the button 20 or the switch 20 must be activated. A new cycle then begins with the appearance of number 6 on the display 20. After the number 6 appears on the display 20 and number 7 appears, the button 20 or the switch 20 must be activated. Then, another new cycle begins with the number 8 and when the number 9 appears on the display 60, the button 20 or switch 20 must be activated. In the foregoing example, the input gate 26 has been set for the numeral 3; the input gate 28 has been set for the numeral 5; the input gate 30 has been set for the numeral 7; and the input gate 32 has been set for the numeral 9. With the four numbers in ascending order, a person trying to operate this lock must have good reflexes because if the number is passed without the button 20 or switch 20 being activated, the lock will not open or will not close, as the lock is designed to do, and it will be necessary to start the combination over in order to operate the lock. A use for this is in regard to a person who has been consuming alcoholic beverages. If this person gets into an automotive vehicle and wants to start the automotive vehicle, if the lock of FIGS. 12 and 2-A is in the ignition circuit, the person operating the automobile must satisfy the combination in the lock in order to start the automobile. A person who has consumed too many alcoholic beverages and who may be in a condition not to be driving, may have difficulty in actuating the lock so as to be able to start the automobile. In addition to use with the ignition circuit of an automobile, the lock of FIGS. 12 and 2-A can be used as an ordinary combination lock. It is to be recalled that the clock 56 is an adjustable clock and in order to not impose too great a barrier to the actuation of the lock of FIGS. 12 and 2-B, the clock 56 can be regulated so as to be slowed down for the signal to appear in the display 60.

In the lock of FIGS. 2-A and 2-B, the combination was 3, 5, 9, 1. Assume that the combination of FIGS. 12 and 2-A is 3, 5, 9, 1. The input gate 26 is set for the numeral 3; the input gate 28 is set for the numeral 5, the input gate 30 is set for the numeral 9; and the input gate 32 is set for the numeral 1. The circuitry is activated and on the display there appears the numerals 0, 1, 2, and 3. With the appearance of the numeral 3, the button 20 or switch 20 must be activated. Then, there starts a second cycle with the number 4. When the number 5 in the second cycle appears on the display 60, the button 20 or switch 20 must be activated. Then, there starts a third cycle with the number 6. There appears on the display the number 6, 7, 8, and 9. With the appearance of the number 9 on the display 60, the button 20 or switch 20 must be activated. Then, there starts a fourth cycle with the appearance of 0 on the display 60. When the number 1 appears on the display 60, the button 20 or switch 20 must be activated in order to activate the lock. If the button 20 or switch 20 is not activated when the proper number appears on the display 60, the unit will automatically terminate operations after 10 numbers appear and said proper number will not appear again. To phrase this differently, after the switch 20 is activated, no number will appear more than once. An illustration of this is with the combination of 3, 5, 9, 1. After the numeral 3 has appeared on the display 60 and the switch 20 has been activated, then there will appear in the second cycle the numerals 4 and 5. If the switch 20 is not activated with the appearance of the numeral 5, the display will continue to show numbers 6, 7, 8, 9, 0, 1, 2, and 3. The display will not show the numeral 4 again and the lock will automatically terminate counting. To repeat, the circuitry of FIGS. 12 and 2-A will go through a count of 10 numbers after the switch 20 has been activated or pushed. The reset counter 48 controls this ten-number cycle. Again, the clock 56 can be adjusted so that the time of appearance of the numerals on the display 60 can be varied. It may be necessary for certain individuals to have a relatively long time period between the display of the numbers on the display 60. For example, it may be desirable to have a time period of 2 seconds or 3 seconds for each number to be displayed on the display 60. Some operators may not have sufficient physical dexterity to operate the switch 20 with the display time of ½ second or 1 second of the numeral on the display 60.

Another example for the circuitry of FIGS. 12 and 2-A is where the numbers are in descending order to descending value. An example of this is the combination of 8, 6, 4, 2. With the activation of the lock, the numbers 0, 1, 2, 3, 4, 5, 6, 7, and 8 will appear on the display 60. With the appearance of the number 8, the switch 20 must be pushed or activated. A second cycle appears with the number 9 and then in the second cycle there appears the numbers 0, 1, 2, 3, 4, 5, and 6. With the appearance of the number 6 in the second cycle, the switch 20 must be activated or pushed. Then there begins a third cycle with the number 7 and in the third cycle there appears the numbers 8, 9, 0, 1, 2, 3, and 4. In the third cycle with the appearance of the number 4, the switch 20 must be pushed or activated. Then, there begins the fourth cycle with the appearance of the number 5 and there appears the numbers 6, 7, 8, 9, 0, 1, and 2. With the appearance of the number 2 on the display 60, the switch 20 must be pushed or activated. If the switch 20 is pushed or activated with the appearance of these numbers on the display 60, the lock is opened or closed as the circuitry may demand.

The reason for the difference in the operation of the lock of the circuits of FIGS. 2-A and 2-B and the circuits of FIGS. 12 and 2-A is that the reset counter 48 is controlled in a different manner.

In the lock of the circuitry of FIGS. 2-A and 2-B, the reset counter is controlled by the output of the decade counter 50 or by the D-output for the decade counter 50.

The lock of the circuitry of FIG. 2-A and FIG. 12 is such that the reset counter is controlled directly by the clock 56 and not by the decade counter 50.

Another distinguishing feature is that the lock of FIGS. 2-A and 2-B is that the reset counter is cleared by the output of the clear gate 52.

As contrasted with this, in the lock of FIGS. 12 and 2-A, the reset counter 399 is cleared by the pulse-and-delay unit 24.

Figure 13:
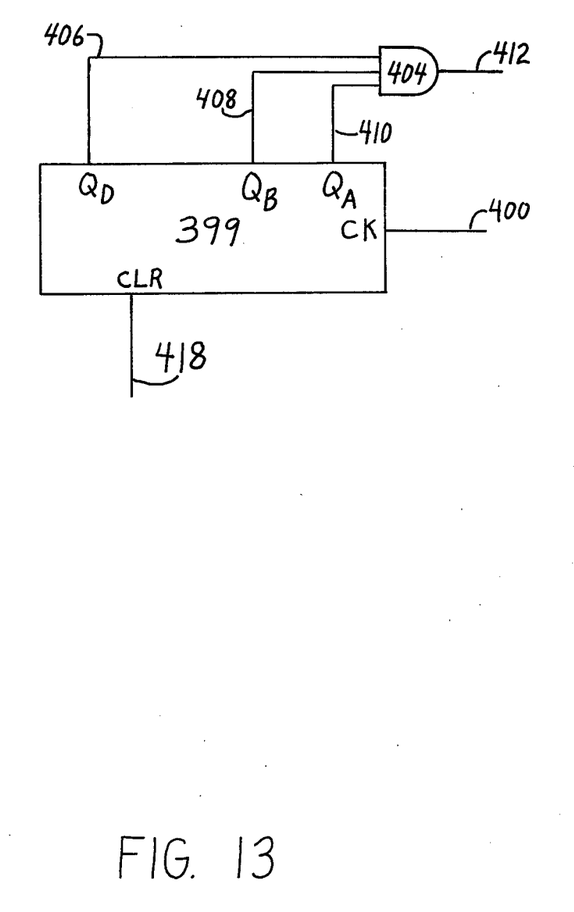

In FIG. 13, there is illustrated the reset counter 399, used in FIG. 12. The reset counter 399 can be a standard, integrated circuit chip identified by number 7493. It is a basic four bit binary counter which can count to 15 in standard binary code. It has 16 states.

It is seen that there are three lines, 406, 408, and 410 connecting with the suming gate 404. The line 412 also connects with the summing gate 404. Then, the line 400 from the clock 56 connects with the rest counter 399 and a line 418 connects with a line from the pulse-and-delay unit 24. In operation, the clock 56 starts the counting of the reset counter 399. With the activation of the circuit by pushing the switch 20 or activating the switch 20, the reset counter can count to 11, such as by 1, 2, 3, 4, 5, 6, 7, 8, 9, 10, and 11. With the activation of the circuit and with the display showing 0, 1, 2, and 3, the switch 20 must be pushed or activated in the step of activating the lock. With the display showing 3, the reset counter is also at 3. With the switch 20 being pushed or activated, the reset counter is set back to 0. In operating the lock, the display then shows number 4 and then number 5. The switch 20 must be pushed or activated. With the display showing number 5, the reset counter is set at 2. With the switch 20 activated, the reset counter is set back to 0. Then, the next number is 9 and the display will show the numbers 6, 7, 8, and 9. With the number 9 appearing on the display, the switch 20 must be activated. The display shows number 9 but the reset counter is set at 4. With the activation of the switch 20, the reset counter is reset to 0. Then, the display will show the number 0 and the number 1. With the display showing the number 1, the switch 20 must be pushed. With the display showing the number 1, the reset counter is at 2. If, to repeat, the operator does not push the switch 20, when the proper number appears onthe display 60, then the circuit is deactivated. For example, when the number 1 appears on the display 60 and the operator does not push the switch 20, the reset counter will count to 11 and deactivate the circuit. By way of recall, when the display 60 shows the number 1, the reset counter is at state 2 and will go through state 11 before deactivating the circuit but this means that the highest number the display will show after that is 0 because the circuit is deactivated with the reset counter counting to 11. Actually, the display will show 9 and then 0 but the time of duration of the number 0 on the display 60 will be for such a short period of time that it may not be visible or discernable.

In the circuitry of FIGS. 12 and 2-A, if the switch 20 is activated when the proper numbers appear, the circuit can be activated so that the load 292 can be changed, for example, to lock a lock or to unlock a lock such as by movement of a bolt. Or, the state of the load 292 can be changed in accordance with the activation of the combination for the circuit.

To repeat, the number of input gates can vary one to an indefinite number. In the illustrations, I have used four input gates which means that the switch 20 must be activated five times to change the state of the load 292. It may be reasonable to use three input gates or five input gates or any reasonable number of input gates so that the combination can be varied. With five input gates, there could be 100,000 combinations for the lock.

With reference to FIG. 13, it is seen that output 406 connects with the D connection. Line 408 connects with the B connection and line 410 connects with the A connection. With the outputs A, B, and D, all being high, then the output 412 of the "AND" gate is high and can be referenced as state 11 or the binary equivalent of the number 11.

From the foregoing, it is seen that I have provided an electronic control apparatus wherein an electric signal is generated for activating a controlled unit. For example, the controlled unit may be an electronic combination lock or screening device for operating an automobile. With this control apparatus and also with the generated electrical signal, it may be possible to unlock the combination lock or to lock the combination lock depending upon the purpose. Actually, the uses for this invention are broader than a lock or a screening device, per se, as the uses can be for restricting access to a safe or restricting entrance to a storage area or use as a screening device for a storage area or for restricting the operation of an important instrument to a few individuals who qualify for operation of the instrument and also who qualify for activating the electronic control apparatus.

From the foregoing and having presented my invention, what I claim is:

1. An electronic control apparatus comprising:
   a. an input gate;
   b. a first storage unit;
   c. said input gate and said first storage unit connecting with each other;
   d. an output gate for producing an unlock signal;
   e. said first storage unit and said output gate connecting with each other;
   f. a second storage unit connecting with said output gate to receive said unlock signal;
   g. a first counter operatively connecting with said second storage unit;
   h. a clear gate;
   i. said first counter and said clear gate connecting with each other;
   j. a second counter connecting with said clear gate;
   k. a third counter connecting with said clear gate;
   l. said clear gate connecting with said first storage unit;
   m. said clear gate being capable of clearing said second counter and said third counter and said first storage unit;
   n. said first counter and said second counter connecting with said input gate to send a signal to the input gate;
   o. a third storage unit;
   p. an input device connecting with said third storage unit;
   q. a pulse generator and delay unit;
   r. said third storage unit connecting with said first counter and with said pulse generator and delay unit for sending a first signal to said first counter and for sending a second signal to said pulse generator and delay unit;
   s. said pulse generator and delay unit connecting with said input gate;
   t. said pulse generator and delay unit controls the second signal to said input gate;
   u. a display unit, operatively, connecting to the second counter;
   v. a device to receive said unlock signal, operatively, connecting with said second storage unit;
   w. a clock connecting with the second counter;
   x. said second storage unit receives said unlock signal and controls said device; and
   y. said first counter, operatively, connecting with said output gate to clear said unlock signal.

2. An electronic control apparatus according to claim 1 and comprising:
   a. said first counter being a Johnson counter;
   b. said second counter being a decade counter; and,
   c. said third storage unit being a latching network.

3. An electronic control apparatus according to claim 1 and comprising:
   a. a plurality of said input gates;
   b. a plurality of said first storage units;
   c. said input gates and said first storage units connecting with each other;
   d. said first storage units and said output gate connecting with each other;
   e. said clear gate connecting with said first storage unit; and
   f. said clear gate being capable of clearing said second counter and said third counter and said first storage units.

4. An electronic control apparatus according to claim 1 and comprising:
   a. a reset gate connecting with said second storage unit to receive said signal;
   b. said first counter connecting with said reset gate; and,
   c. said reset gate being capable of clearing said first counter.

5. An electronic control apparatus according to claim 3 and comprising:
   a. a reset gate connecting with said second storage unit to receive said signal;
   b. said first counter connecting with said reset gate; and
   c. said reset gate being capable of clearing said first counter.

6. An electronic control apparatus comprising:
   a. an input gate;
   b. a first storage unit;
   c. said input gate and said first storage unit connecting with each other;
   d. an output gate for producing an unlock signal;
   e. said first storage unit and said output gate connecting with each other;
   f. a second storage unit connecting with said output gate to receive said unlock signal;
   g. a first counter operatively connecting with said second storage unit;
   h. a clear gate;
   i. said first counter and said clear gate connecting with each other;
   j. a second counter connecting with said clear gate;
   k. a third counter connecting with said second counter;
   l. said clear gate connecting with said first storage unit;
   m. said clear gate being capable of clearing said second counter and said third counter and said first storage unit;
   n. said first counter and said second counter connecting with said input gate to send a signal to the input gate;
   o. a third storage unit;
   p. an input device connecting with said third storage unit;
   q. a pulse generator and delay unit;
   r. said third storage unit connecting with said first counter and with said pulse generator and delay unit for sending a first signal to said first counter and for sending a second signal to said pulse generator and delay unit;

s. said pulse generator and delay unit connecting with said input gate;
t. said pulse generator and delay unit controls the second signal to said input gate;
u. a display unit, operatively, connecting to the second counter;
v. a device to receive said unlock signal, operatively, connecting with said second storage unit;
w. a clock connecting with the second counter;
x. said second storage unit receives said unlock signal and controls said device; and,
y. said first counter, operatively, connecting with said output gate to clear said unlock signal.

7. An electronic control apparatus according to claim 6 and comprising:
a. said first counter being a Johnson counter;
b. said second counter being a decade counter; and,
c. said third storage unit being a latching network.

8. An electronic control apparatus according to claim 6 and comprising:
a. a plurality of said input gates;
b. a plurality of said first storage units;
c. said input gates and said first storage units connecting with each other;
d. said first storage units and said output gate connecting with each other;
e. said clear gate connecting with said first storage unit; and
f. said clear gate being capable of clearing said second counter and said third counter and said first storage units.

9. An electronic control apparatus according to claim 6 and comprising:
a. a reset gate connecting with said second storage unit to receive said signal;
b. said first counter connecting with said reset gate; and,
c. said reset gate being capable of clearing said first counter.

10. An electronic control apparatus according to claim 8 and comprising:
a. a reset gate connecting with said second storage unit to receive said signal;
b. said first counter connecting with said reset gate; and
c. said reset gate being capable of clearing said first counter.

* * * * *